United States Patent
Parry et al.

(10) Patent No.: US 9,069,641 B2
(45) Date of Patent: Jun. 30, 2015

(54) UPDATING FIRMWARE ON MOBILE DEVICES

(71) Applicant: BlackBerry Limited, Waterloo (CA)

(72) Inventors: Thomas Owen Parry, Cambridge (CA); Jason Lee Carter, Davie, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/029,279

(22) Filed: Sep. 17, 2013

(65) Prior Publication Data

US 2015/0082297 A1 Mar. 19, 2015

(51) Int. Cl.
*G06F 9/44* (2006.01)
*G06F 9/445* (2006.01)

(52) U.S. Cl.
CPC ............................ *G06F 8/65* (2013.01)

(58) Field of Classification Search
CPC .......................................................... G06F 8/65
USPC .................................................. 717/168–178
See application file for complete search history.

(56) References Cited

U.S. PATENT DOCUMENTS

| | | | |
|---|---|---|---|
| 7,412,232 B2 | 8/2008 | Wilson et al. | |
| 7,480,907 B1 * | 1/2009 | Marolia et al. | 717/174 |
| 7,689,394 B2 * | 3/2010 | Furem et al. | 703/8 |
| 7,890,427 B1 | 2/2011 | Rao et al. | |
| 8,010,842 B2 | 8/2011 | Krivopaltsev et al. | |
| 8,307,095 B2 | 11/2012 | Clark et al. | |
| 8,363,102 B1 * | 1/2013 | Kadoch et al. | 348/148 |
| 2005/0055397 A1 | 3/2005 | Zhu et al. | |
| 2005/0132349 A1 * | 6/2005 | Roberts et al. | 717/168 |
| 2007/0150595 A1 * | 6/2007 | Bhorania et al. | 709/226 |
| 2008/0222621 A1 * | 9/2008 | Knight et al. | 717/151 |
| 2009/0204578 A1 | 8/2009 | Dang | |
| 2009/0260004 A1 | 10/2009 | Datta et al. | |
| 2011/0213681 A1 * | 9/2011 | Shahid | 705/27.1 |

(Continued)

FOREIGN PATENT DOCUMENTS

| | | |
|---|---|---|
| CA | 2743685 | 12/2011 |
| CN | 102857559 | 1/2013 |

OTHER PUBLICATIONS

Hoffmeyer, Jim, et al. "Radio software download for commercial wireless reconfigurable devices." Communications Magazine, IEEE 42.3 (2004), pp. S26-S32.*

(Continued)

*Primary Examiner* — Satish Rampuria
(74) *Attorney, Agent, or Firm* — Fish & Richardson P.C.

(57) ABSTRACT

Updating firmware on mobile devices can be performed during device management (DM) sessions between mobile devices and one or more servers. A server can provide data to at least one node of a firmware update management object (FUMO) stored at a mobile device. The data can indicate a plurality of different update file locations accessible via a network. The mobile device can download a plurality of update files from the plurality of different update file locations via the network in response to receiving the command. From a set of update files, each mobile device can thus obtain its particular firmware update as a subset of the update files as indicated by its FUMO. Metadata may be provided to the FUMO to express one or more conditions that the mobile device must meet in order to download respective update files.

16 Claims, 7 Drawing Sheets

(56) References Cited

U.S. PATENT DOCUMENTS

2011/0314462 A1* 12/2011 Clark et al. .................. 717/169
2014/0006556 A1* 1/2014 Shapiro et al. ................ 709/217

OTHER PUBLICATIONS

Bing, Benny. "A fast and secure framework for over-the-air wireless software download using reconfigurable mobile devices." IEEE Communications Magazine 44.6 (2006), pp. 58-63.*

Ramacher, Ulrich. "Software-defined radio prospects for multistandard mobile phones." IEEE Computer 40.10 (2007), pp. 62-69.*

Ryu, Hyun-Ki, et al. "The design of remote vehicle management system based on OMA DM protocol and AUTOSAR S/W architecture." Advanced Language Processing and Web Information Technology, 2008. ALPIT'08. International Conference on. IEEE, 2008, pp. 393-397.*

Hanna, Steven, et al. "Take two software updates and see me in the morning: The case for software security evaluations of medical devices." Proceedings of the 2nd USENIX conference on Health security and privacy. USENIX Association. 2011, pp. 1-5.*

Written Opinion and International Search Report issued in PCT/CA2014/000693 on Nov. 4, 2014; 7 pages.

* cited by examiner

FIG. 10

UPDATING FIRMWARE ON MOBILE DEVICES

FIELD

This disclosure relates to wireless communications, more specifically, to updating firmware of mobile devices.

BACKGROUND

Updating firmware of mobile devices can be performed wirelessly over the air. The Open Mobile Alliance (OMA) has developed techniques for device management (DM) including techniques for updating firmware. A typical firmware update may require dozens, hundreds, thousands of files, or more.

Some solutions wrap all necessary update files into a single file to be downloaded by a particular mobile device. However, the various firmware/hardware permutations of a group of deployed mobile devices can be of high number and of highly variability. This can result in unique update files being required for each unique permutation. Such update files are known to be generated ahead of time or generated on the fly, as needed. Both of these methods can be inefficient, wasteful, and costly, particularly if only a subset of the permutations is actually in use. Generating a large number of unique update files ahead of time can consume a large amount of storage space. Generating unique update files on the fly can result in network bottlenecks when mobile device updates are performed over a short period of time (e.g., during a morning commute) as computing power and network resources to handle such network traffic peaks may not be available.

Thus, known techniques for updating mobile device firmware suffer from a number of disadvantages, including inefficient use of storage space, high network demands, and costly implementation.

BRIEF DESCRIPTION OF THE DRAWINGS

The drawings illustrate, by way of example only, embodiments of the present disclosure.

DETAILED DESCRIPTION

Updating firmware on a mobile device can be performed wirelessly over a network during a device management session established between the mobile device and one or more servers. During the device management session, the server can provide data to a firmware update management object (FUMO) maintained at the mobile device. Such data can indicate a plurality of different update file locations that are accessible to the mobile device for download via the network. By using a plurality of different update file locations specified in the FUMO, firmware updates can be performed more efficiently and in a scalable manner. For instance, each mobile device can fetch the particular files specified in its FUMO to reduce or eliminate the need to generate a single unique update file for each possible update permutation.

Single unique update files are known to be generated en masse and in advance for each update permutation or generated on the fly, as needed. In the former scenario, a large amount of storage space is consumed in storing a large number of pre-generated, unique files, which can be wasteful. In the latter scenario, updates can be delayed during times of high demand, such as when a multitude of mobile devices require updating, and it may be impractical to keep available the peak processing power and network capacity required to accommodate such spikes. In addition, caching at a content distribution network (CDN) a multitude of unique update files may not be able to be performed effectively given that the unique update files ultimately need to be obtained from the servers at which the unique update files are generated or published. As will be understood from the below, a FUMO that specifies a plurality of different update file locations can be implemented in a manner compliant with the relevant Open Mobile Alliance (OMA) device management (DM) standard(s) while improving update performance and solving problems associated with single unique update files, whether pre-generated or generated on demand.

Figure 1:
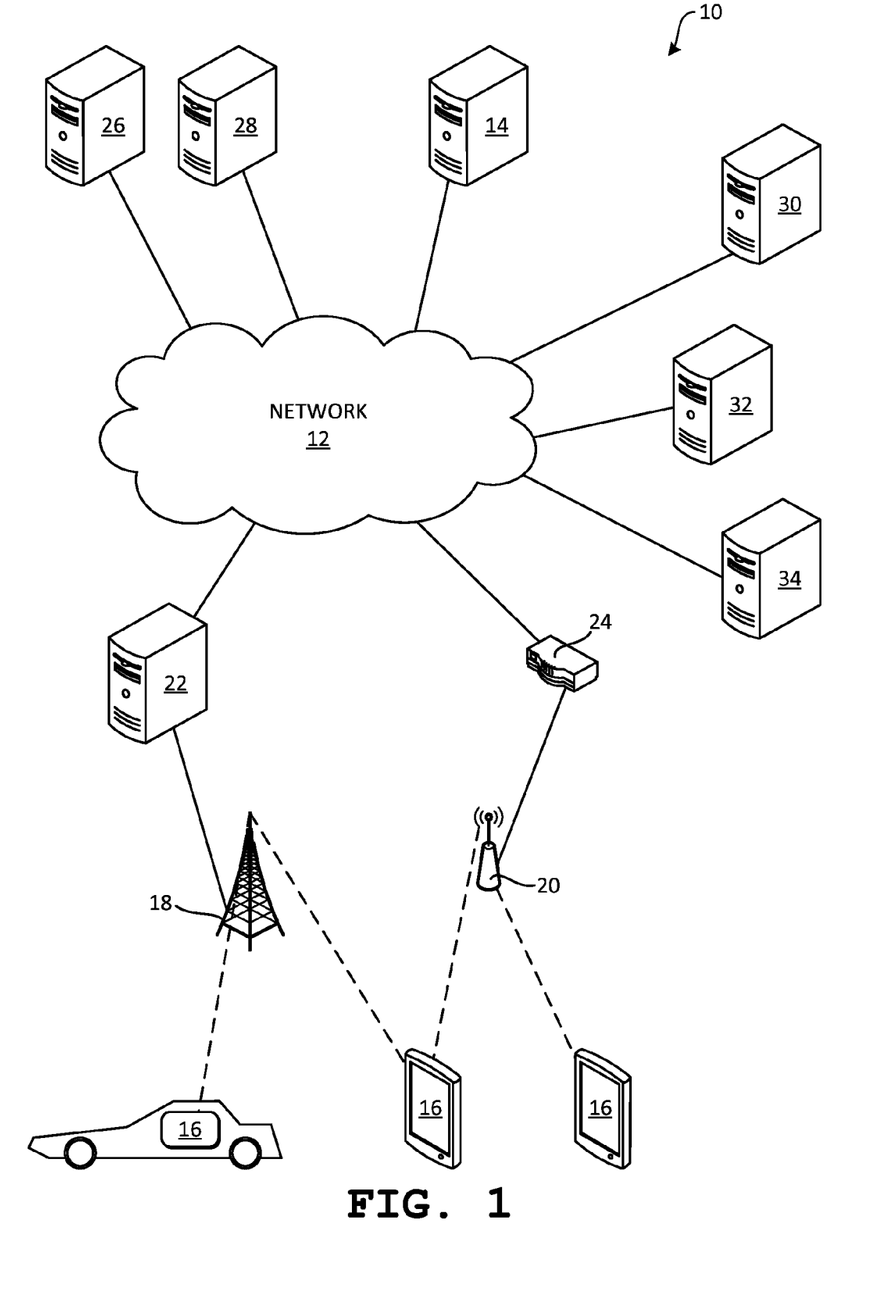
FIG. 1 is a block diagram of a computer system.

FIG. 1 shows a computer system 10. The computer system 10 includes a plurality of servers as well as connecting infrastructure, such as switches, routers, and other connecting equipment indicated generally as network 12. The network 12 can include one or more of a private network controlled by an organization (e.g., a company or institution), such as an intranet, a public network (e.g., the Internet), and other types of networks.

A plurality of servers, represented by server 14, is connected to the network 12 and provides services, content, and other functionality to a plurality of mobile devices 16. Such functionality is widely known and includes such things as email, instant messaging, website hosting and viewing, data hosting, image sharing, voice over Internet protocol (VOIP) services, electronic publishing, document storage, and the like.

The mobile device 16 is connected to the network 12 via one or more types of wireless service, such as cellular telephone (e.g., 4G, 3G, 2G, 1G, etc.), Wi-Fi, wireless local-area network (WLAN), Bluetooth™, and combinations of such. Such services may be referred to as bearers, and the mobile device 16 may switch between bearers as it changes geographic positions. Suitable infrastructure, such as cellular radio towers 18, wireless access points 20, cellular service provider infrastructure/servers 22, and routers/switches 24, is provided to facilitate communication between mobile devices 16 and the network 12. The preceding is merely illustrative and, for sake of clarity, not all components of all examples are described.

The mobile devices 16 may be various types of smartphones, cellular telephones, tablet computers, vehicle in-dash computers, and similar electronic communication devices that spend a significant amount of time operating from battery power and communicating wirelessly. The mobile devices 16 operate using a combination of hardware and firmware, with the term firmware as used herein applying to software as well.

Such firmware can include a kernel, an operating system, applications (e.g., a phone application, messaging applications, a calendar application, etc.), application programming interfaces (APIs), libraries and other resources, and similar programmatic elements that provide updatable functionality to the mobile device 16.

Update servers 26, 28 are connected to the network 12 and configured to provide firmware updates to the mobile devices 16. Such updates may be developed and generated by the manufacturer, vendor, or deployer of the mobile devices 16 and made accessible to the update servers 26, 28 for distribution to the mobile devices 16. The update servers 26, 28 may be configured to operate according to an OMA DM standard or methodology. The update servers 26, 28 may be known as DM servers and may be configured to provide other DM services to the mobile devices 16 or may be configured to only provide firmware updates. The update servers 26, 28 may be configured to manage firmware updates without themselves storing update files or, alternatively, one or more of the update servers 26, 28 may store update files.

Servers 30, 32, 34 forming a content distribution network may be connected to the network 12 and configured to receive update files from the update servers 26, 28. The CDN servers 30, 32, 34 are accessible to the mobile devices 16 via the network 12, so that the mobile devices 16 can download update files stored on the CDN servers 30, 32, 34.

Figures 2, 3, 4:
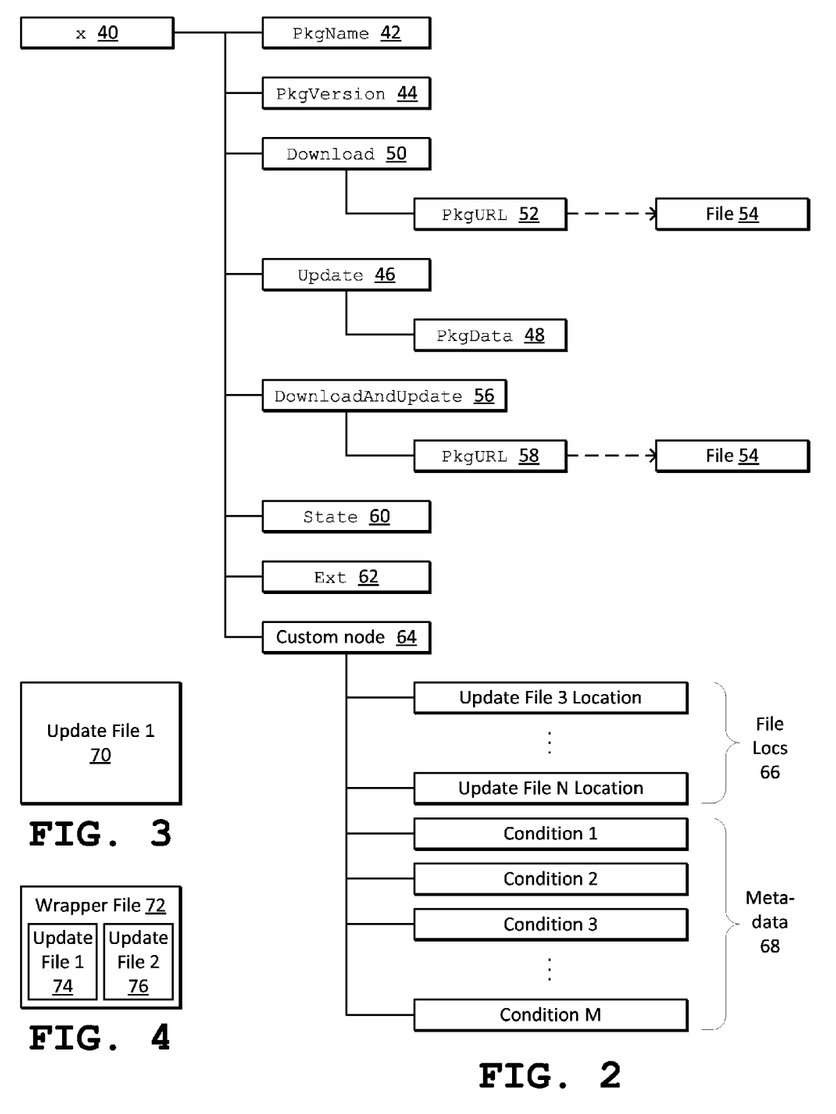
FIG. 2 is schematic diagram of a firmware update management object having nodes identifying update file locations and storing metadata.
FIG. 3 is a schematic diagram of an update file.
FIG. 4 is a schematic diagram of a wrapper update file.

As shown in FIG. 2, each of the mobile devices 16 is configured to store a firmware update management object. The FUMO may be permanent or dynamic. There may be one or more FUMOs in a device management tree, and these may be grouped or located in various ways, such as under a common node. Further, when complying with OMA, only one update package or reference to an update package is associated with each FUMO. In this embodiment, data is provided to at least one node of the FUMO that is not a package uniform resource locator (URL) node, and such data indicates a plurality of different update file locations on the network 12. Update files stored at these locations constitute a firmware update along with any other update file identified by a package URL node of the FUMO, if present.

A placeholder node 40 of the FUMO acts as a placeholder for a firmware update package unique identifier. The placeholder node 40 may be a permanent node that is pre-created or created as needed. A package name node 42 may be provided to specify the name of the firmware update package. A package version node 44 may be provided to specify version information for the firmware update package.

The FUMO may include an update node 46 and an associated package data node 48, where the update node 46 is a target of an OMA DM "Exec" command that initiates an update using a binary firmware update package that is provided directly via the package data node 48.

The FUMO may include a download node 50 and an associated package URL node 52. The download node 50 is a target of an OMA DM "Exec" command that initiates download of a single-file update package indicated at the package URL node 52, which may be specified by an OMA DM "Replace" command. In effect, the package URL node 52 identifies a single firmware update file 54 that is available to the mobile device 16 via the network 12.

The FUMO may include a download and update node 56 and an associated package URL node 58. The download and update node 56 is a target of an OMA DM "Exec" command that initiates download and installation of a single-file update package indicated at the package URL node 58, which may be specified by an OMA DM "Replace" command. In effect, the package URL node 58 identifies a single firmware update file 54 that is available to the mobile device 16 via the network 12.

Further nodes may also be provided, such as a state node 60 that contains a value indicating the current state of the mobile device 16 with respect to a particular firmware update and an extension node 62 that supports vendor-specific extensions.

In this embodiment, the FUMO further includes one or more custom nodes 64 that can, for example, be nodes that are unspecified by an OMA standard. The custom node 64 can have one or more child nodes that are update file location nodes 66 that indicate one or more update file locations. The update file location nodes 66 are different from the package URL nodes 52, 58. The update file location nodes 66 can indicate URLs or other location identifiers for update files available via the network 12. The update file location nodes 66 can respond to OMA DM "Add" or "Replace" commands, so that the URLs can be specified by an update server 26, 28. An update file location node 66 may further indicate a name, unique identifier (e.g., a hash), or property (such as byte size) for the associated update file. In some embodiments, a node 64, 66 may provide a list of update file locations.

The FUMO may further include one or more child nodes of the custom node 64 to indicate metadata 68 that expresses at least one condition that the mobile device 16 must meet in order to download one or more of the plurality of update files. Conditions can specify any combination of one or more of a time at which to download one or more of the plurality of update files indicated by nodes 52, 58, 66, a type of wireless service over which to download one or more of the plurality of update files, a maximum amount of data to download over a specified type of wireless service, an order in which to download the plurality of update files, and an operating condition of a vehicle in which the mobile device 16 is disposed. Additional conditions can also be used. Conditions can be expressed in any suitable format, such as encoded text strings, Extensible Markup Language (XML), JavaScript Object Notation (JSON), and the like. Metadata 68 may also include instructions, parameters, configurations, text to display at the mobile device 16, or similar, and is not limited to conditions.

A condition for a time at which to download one or more of the plurality of update files can be expressed as a time of day (e.g., HH:MM:SS) at which to begin downloading update files or a range of times of day during which to download update files. A time condition may be linked to individual update files by name or unique identifier. Alternatively, a time condition may specify a size range for update files that are to be governed by the condition. For example, a time condition may limit downloading of files larger than 20 MB to between the hours of 2 AM and 6 AM, local time as tracked by the mobile device 16. This can advantageously temporally distribute network loads during large updates to a multitude of mobile devices 16.

A condition for a type of wireless service over which to download update files can indicate one or more of the wireless services provisioned on the mobile device 16. Such a bearer condition may be linked to individual update files by name or unique identifier. Alternatively, a bearer condition may specify a size range for update files that are to be controlled by the condition. For example, a bearer condition may limit downloading files larger than 10 MB to Wi-Fi service, so as to reduce load on cellular services and potentially reduce cost to the user of the mobile device 16. The bearer condition can help distribute network loads, which can particularly be advantageous during large updates to a multitude of mobile devices 16.

A condition for a maximum amount of data to download over a specified type of wireless service can indicate one or more of the wireless services provisioned on the mobile device 16 and a respective maximum data amount. For example, such a maximum data condition may limit a total amount of data to download for a particular update to be 100 MB over 4G. This can reduce total load on cellular services and may potentially reduce cost to the user of the mobile device 16.

A condition for an order in which to download update files can indicate update files by name or unique identifier. Such an order condition may include an ordered list of unique identifiers, and the mobile device 16 can be configured to follow such condition by proceeding to download the indicated files according to the ordered list. This can improve efficiency when updating different components of firmware, as some update files may be required to be installed before other update files. Further, update files that may be more important (e.g., security patches) and can be prioritized.

A condition for an operating condition of a vehicle in which the mobile device 16 is disposed can indicate operating conditions such as vehicle speed, vehicle state (e.g., engine on, engine off, plugged in to external electrical power, etc.), vehicle battery voltage, vehicle fuel level, storage space available on the vehicle (e.g., when the mobile device 16 is an in-dash computer or augments such a computer), and similar. Such operating conditions can specify update files to download by name, unique identifier, size, or other property, so as to ensure that vehicle resources are sufficient and that downloads can be completed efficiently. For example, a vehicle operating condition can specify that large update files are only to be downloaded a slow vehicle speeds, so as to reduce increased network overhead due to frequent cellular station handoffs that may occur at high vehicle speeds. In another example, a condition may stipulate that large files are only to be downloaded when the engine is on or when the vehicle battery voltage is greater than a threshold amount, so as to reduce excessive drain on the vehicle battery.

Other conditions can include times at which to communicate FUMO status updates to the update server 26, 28.

It should be noted that the number of update files (i.e., 1–N) specified by the nodes 52, 58, 66 need not be same as the number of conditions (i.e., 1–M) specified by the metadata nodes 68. For example, some update files may have not have conditions, some update files may have multiple conditions, some or all update files may share the same condition(s), or conditions may not be present.

In this embodiment, during an update, the update server 26, 28 can perform one or more OMA DM "Add" and/or "Replace" commands on the FUMO to specify locations for any of the package URL nodes 52, 58 and any of the update file location nodes 66, as well as to specify metadata 68 defining any conditions that are to be followed during the update. The mobile device 16 then downloads the update file 54 identified by any package URL node 52, 58 and further downloads any update files identified by the update file location nodes 66. This allows multiple different update file locations to be indicated by the same FUMO and thus multiple different update files contributing to the firmware update to be downloaded from different sources, such as several of the update servers 26, 28 and the CDN servers 30, 32, 34. Thus, when updating a plurality of mobile devices 16, which may have many different update paths and requirements, a set of component update files can be provided at different locations and the FUMO for each mobile device 16 can indicate which of these update files to download to complete the particular update for the respective mobile device 16 and further indicate any conditions as to how such files must be downloaded.

Nodes 66, 68 may also contain mixed data, such that a particular node 66, 68 includes both an update file location and metadata expressing a condition for the file stored at that location.

With reference to FIG. 3, a file 54 specified by a package URL node 52, 58 may be a single update file 70. Alternatively, as shown in FIG. 4, a file 54 specified by a package URL node 52, 58 may be a wrapper file 72 that groups several different update files 74, 76. The files 70, 74, 76 are distinct from the files specified by the custom update file location nodes 66 of the FUMO. Conditions may be applied to one or more of the files 70, 72, 74, 76.

Figure 5:
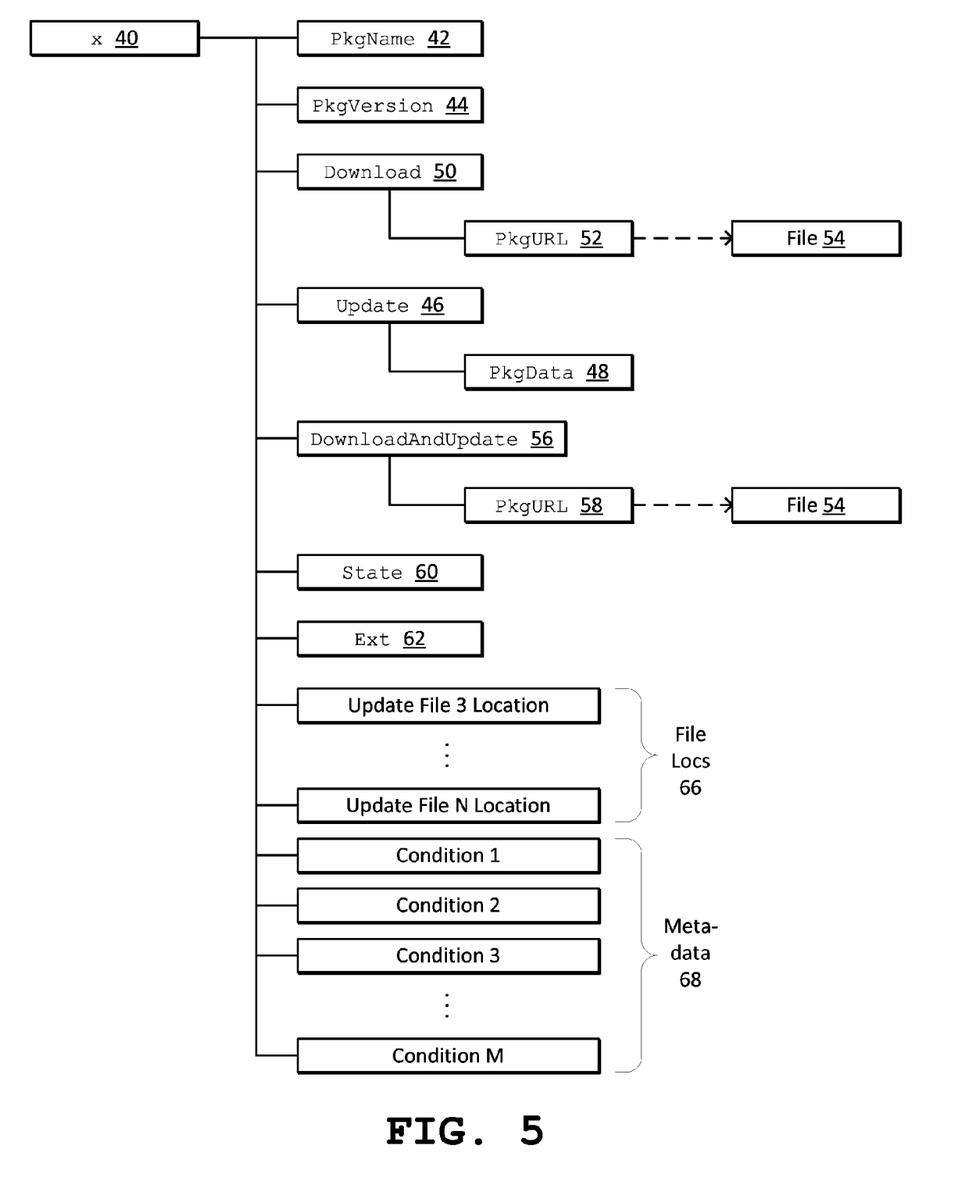
FIG. 5 is schematic diagram of another firmware update management object having nodes identifying update file locations and storing metadata.

FIG. 5 illustrates an alternate embodiment of the FUMO of FIG. 2. In this embodiment, the custom update file location nodes 66 and metadata nodes 68 are child nodes of the placeholder node 40. In various embodiments, the custom update file location nodes 66 and metadata nodes 68 can have various relationships with the other nodes 40-52, 56-62 of the FUMO and with each other. In some embodiments, one or more of the update file location nodes 66 and the metadata nodes 68 may be child nodes of an extension node 62.

Figure 6:
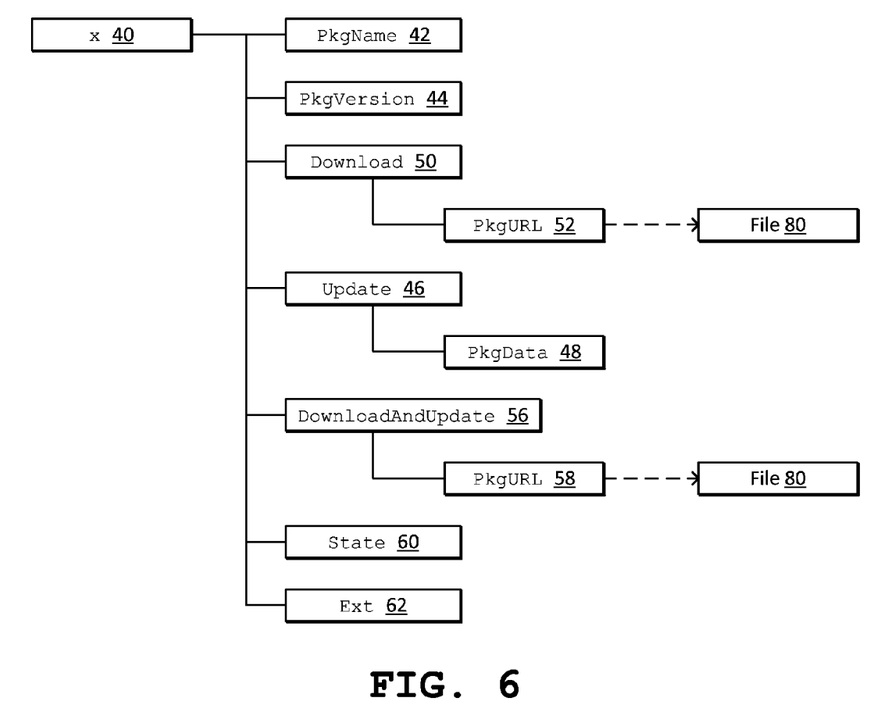
FIG. 6 is schematic diagram of a firmware update management object having nodes identifying manifest update files.

FIG. 6 illustrates another embodiment of a FUMO. The description for FIG. 2 can be referenced for components having like reference numerals and, for sake of clarity, only differences will be discussed in detail.

The FUMO may include a package URL node 52, 58 that indicates a single manifest update file 80 at a location available to the mobile device 16 via the network 12. In this embodiment, the single file 80, which may be termed a recipe file, is configured to contain data indicating a plurality of different update file locations, and further may be configured to contain metadata that indicates any conditions that the mobile device 16 must follow when downloading the update files. The single manifest update file 80 may identify all the update files required for a particular firmware update. In this embodiment, the single manifest update file 80 does not contain binary update data.

In other embodiments, the single manifest update file 80 can contain one or more binary chunks of data in line with any other content of the file 80. Such binary data may be encoded as a series of hexadecimal octets between suitable delimiters (e.g., XML tags) that denote the start and end of binary data. The binary data may be used to store one or more small executable programs that are required prior to downloading the bulk of an update. For example, a new update client (e.g., DM clients 648 and 730) or a patch to an existing update client may be provided as binary data in the file 80. This may be advantageous when the update includes a new metadata expression or value that requires interpretation under new logic. In another example, binary data transmitted in the file 80 may include one or more authentication signatures for the file 80 or for another file or document forming part of the update.

Figure 7:
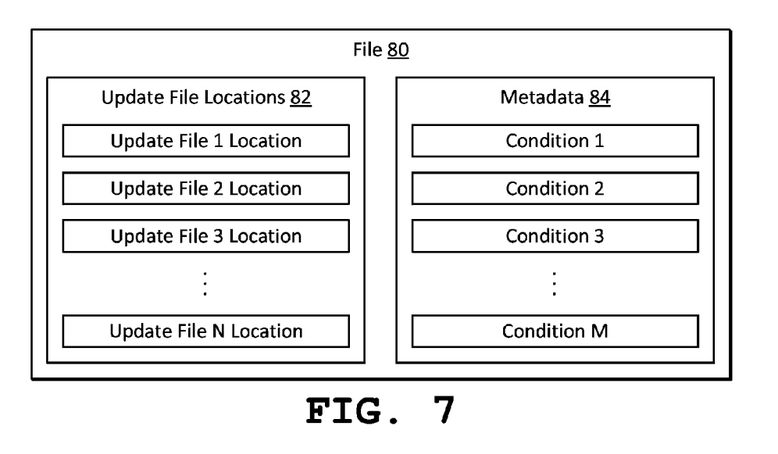
FIG. 7 is schematic diagram of a manifest update file containing update file locations and metadata.

As shown in FIG. 7, the single manifest update file 80 includes a plurality of different update file locations 82 of a plurality of different update files, which may be stored at several of the update servers 26, 28 and the CDN servers 30, 32, 34 or are otherwise available via the network 12.

The single manifest update file 80 can further include metadata 84 indicating conditions for downloading one or more of the plurality of different update files. The conditions may be as discussed elsewhere herein (e.g., time of day, bearer, etc.).

The embodiment depicted in FIGS. 6 and 7 can use additional custom nodes, such as any of nodes 64, 66, 68 (FIGS. 2 and 5), to indicate additional update file locations and metadata.

Figure 8:
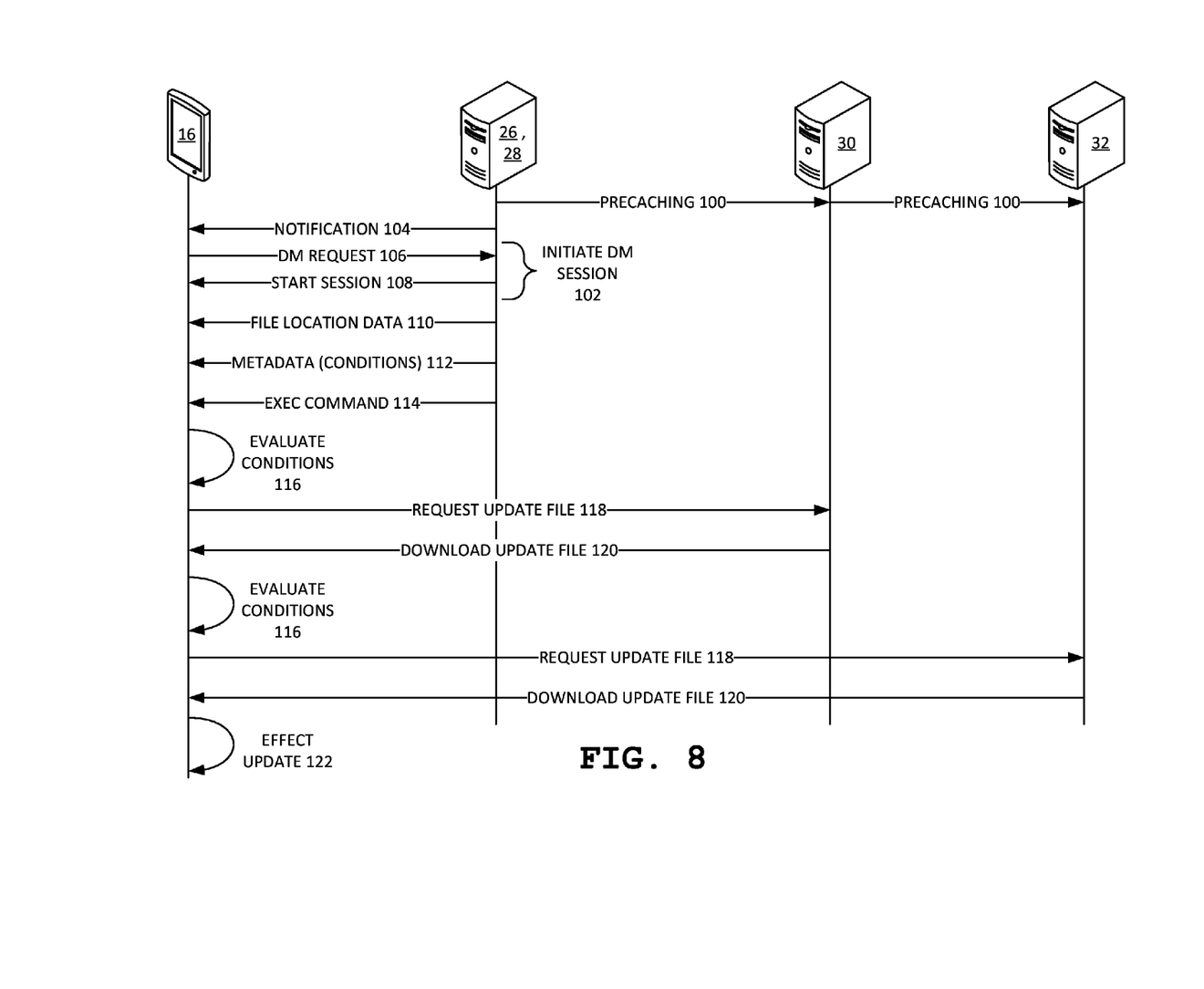
FIG. 8 is a schematic diagram showing communications between servers and a mobile device during a device management session.

FIG. 8 depicts a communications diagram for the system 10, illustrating a method of updating firmware on a mobile device 16. The communications depicted and described generally occur via the network 12 and various wireless services.

After updated firmware has been developed and released, at 100, the update servers 26, 28 can precache a plurality of different update files at the CDN servers 30, 32, 34 or other servers. In addition or alternatively, one or more of the update servers 26, 28 can host one or more of the update files. As discussed elsewhere herein, different subsets of the plurality of different update files form particular updates for particular mobile devices, so that a particular mobile device 16 may need only to download a particular subset of the plurality of different update files.

A device management session is then initiated between an update server 26, 28 and the mobile device 16, at 102. The DM session can be initiated according to an OMA DM standard. The server 26, 28 may trigger the device 16 to initiate the session by sending an information request or notification 104, which may include a short message service (SMS) message, to the mobile device 16. The mobile device 16 can then initiate the DM session by responding to the server 26, 28 with a DM request 106 that includes relevant information for firmware update, such as device type, hardware version, and firmware version. Another SMS message 108 may be sent from the update server 26, 28 to the mobile device 16 in response, and the DM session is commenced.

After the DM session is established, the update server 26, 28 can provide, at 110, data to at least one node of a suitable FUMO stored at the mobile device 16. The data can indicate locations of different update files that were precached at 100. The data may be provided to the FUMO by way of custom nodes, such as nodes 64, 66 (FIGS. 2 and 5) discussed elsewhere herein in addition to any package URL node 52, 58, or by pointing a package URL node 52, 58 to a single manifest update file 80 (FIGS. 6 and 7) that contains a plurality of different update file locations 82. Providing such data to the FUMO can be performed by way of OMA DM "Add" and/or "Replace" commands.

The specific update file location data provided at 110 by the server 26, 28 can be dependent on the device response 106. That is, the server 26, 28 can specifically configure the update for the particular device type, version, etc of the mobile device 16 providing the response 106. It is noteworthy that each specifically configured update reflected by different sets of update file location data provided at 110 to different mobile devices 16 relies on the same set of update files, which were precached at 100. Thus, different firmware updates for variously configured and versioned devices 16 reference the same subset of the update files.

The update server 26, 28 can further provide, at 112, metadata to at least one node of the FUMO. Such metadata can indicate conditions for downloading and installing update files, as discussed elsewhere herein. The metadata may be provided to the FUMO by way of custom nodes, such as nodes 68 (FIGS. 2 and 5) discussed elsewhere herein, or by including the metadata in a single manifest update file 80 (FIGS. 6 and 7). Providing metadata to the FUMO can be performed by way of OMA DM "Add" and/or "Replace" commands.

After the FUMO has been configured with file location data and any metadata, a command, at 114, can be sent from the server 26, 28 to the mobile device 16 to begin downloading of update files. This can be accomplished by the update server 26, 28 performing an OMA DM "Exec" command targeting a suitable node of the FUMO, such as the download node 50 or download and update node 56. Downloading of any update files may be governed by conditions expressed by metadata 68, 84. Hence, the mobile device 16 can be configured to evaluate such conditions in response to the OMA DM "Exec" command or in response to completion of download of a single manifest update file 80 that contains the metadata 84, as the case may be.

The mobile device 16 evaluates any conditions expressed by the metadata, at 116, to determine whether the mobile device 16 or its environment (e.g., a vehicle hosting the mobile device) meets or violates the conditions represented by the metadata. The mobile device 16 can be configured to repeat evaluation of the conditions until the update is complete. For example, if a condition stipulates that a particular update file can only be downloaded over a Wi-Fi or 4G bearer, then the mobile device 16 repeatedly evaluates whether or not such a bearer is available until the particular update file has been successfully downloaded. The type of repetition for evaluation of conditions can be any suitable type, such as periodic, periodic with back off, trigger based (e.g., a listener detects when bearers change and in response evaluates conditions), and similar.

As the conditions permit, the mobile device 16 requests, at 118, update files from the various different update file locations indicated by the FUMO. As discussed elsewhere herein, such update files may be indicated by a package URL node 52, 58, by the contents of a single manifest update file 80 (which may be indicated by a package URL node 52, 58), by custom nodes 64, 66 of the FUMO, of by some combination of these. Update files are then downloaded, at 120, from the different hosting servers 26-34.

Lastly, the mobile device 16 can effect the update by using the downloaded update files to update its firmware, at 122. This may be performed after all the indicated update files are downloaded, or may be performed while update files are downloaded. In addition, during the update process, the mobile device 16 may send FUMO status updates to the server 26, 28.

Figure 9:
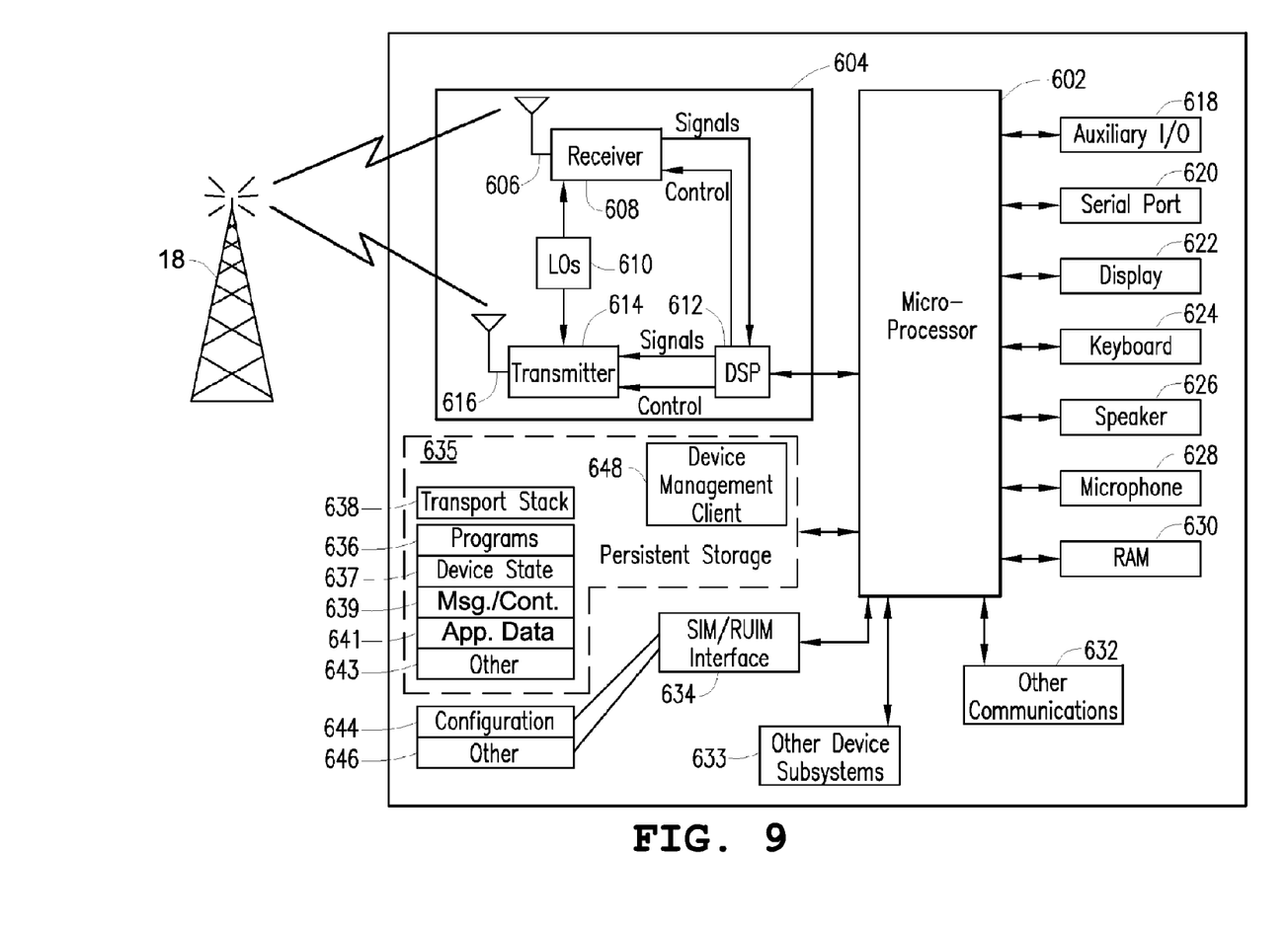
FIG. 9 is a block diagram of an example mobile device.

FIG. 9 depicts a block diagram of an example mobile device 16 suitable for use with the techniques discussed herein. A processor 602 providing for the overall control of the mobile device 16 is operably coupled to a communication subsystem 604 which includes a receiver 608 and transmitter 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications network with which the mobile device 16 is intended to operate. Regardless of the particular design, however, signals received by antenna 606 from a radio tower 18 (or other wireless signal conveyor) are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

The processor 602 also interfaces with further device subsystems such as auxiliary input/output (I/O) 618, data port 620, display 622, keyboard 624, speaker 626, microphone 628, random access memory (RAM) 630, other communications facilities 632, which may include, for example, a short-range communications subsystem, and any other device subsystems generally labeled as reference numeral 633. To control access as well as supply the initial DM configuration, a Subscriber Identity Module (SIM) or Removable user Identity Module (RUIM) interface 634 is also provided in communication with the processor 602. In one implementation, SIM/RUIM interface 634 is operable with a SIM/RUIM card having a number of key configurations 644 and other information 646 such as identification, DM configuration, and subscriber-related data.

Operating system firmware and transport stack firmware may be stored in a non-transitory computer-readable medium 635 (i.e., non-volatile storage) which may be implemented using Flash memory or another appropriate memory. In some embodiments, computer-readable medium 635 may be segregated into different areas, e.g., storage area for application programs 636 (which may include operating system firmware) and transport stack 638, as well as data storage regions such as device state 637, messages and contacts 639, other application data 641, and other data storage areas generally labeled as reference numeral 643. Additionally, a DM client module 648 is provided and may contain executable code for configuring the processor 602 to perform operations in accordance with OMA DM protocols as well as other protocols, which may comprise standard protocols and/or custom/unspecified protocols according to the teachings discussed herein. The DM client module 648 may store one or more FUMOs and include suitable functionality associated with FUMO operations.

Figure 10:
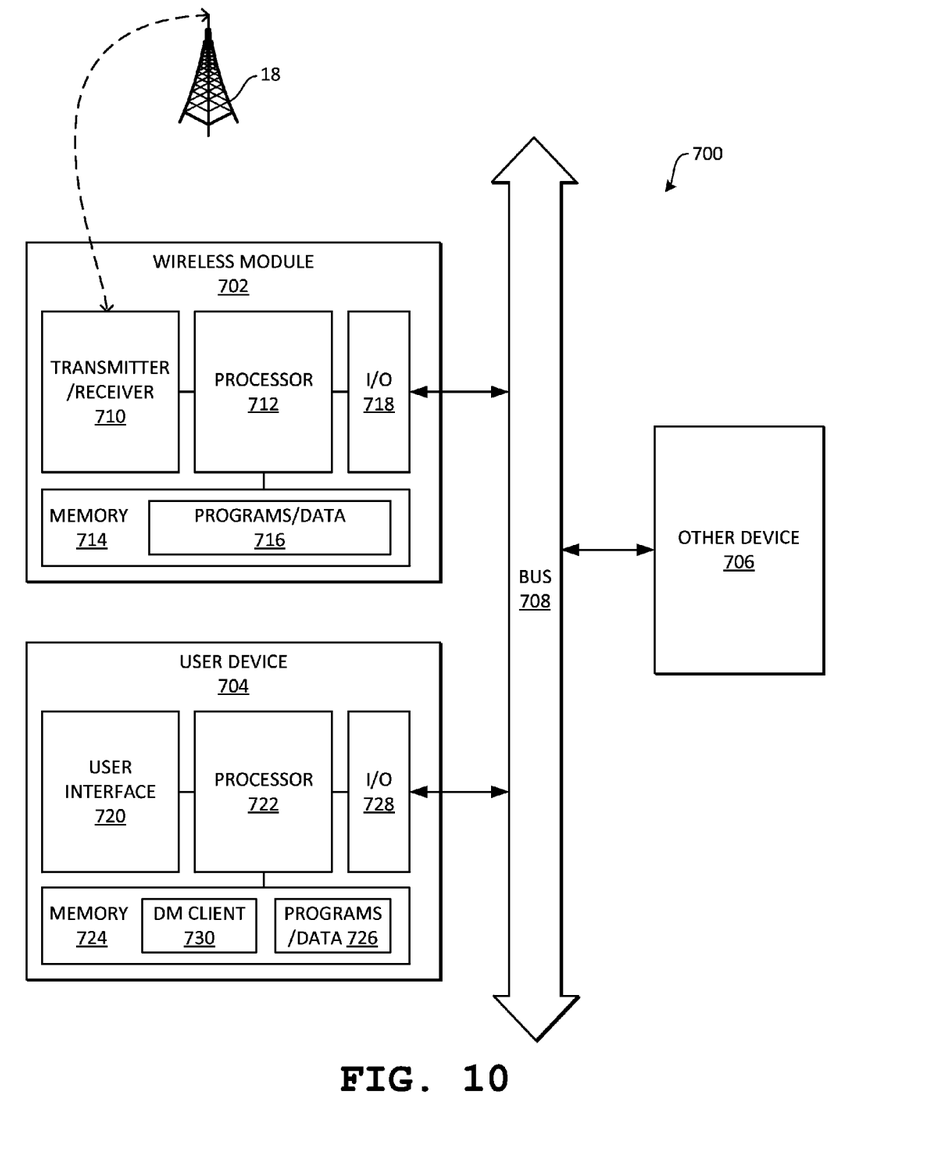
FIG. 10 is a block diagram of a distributed system having a user device with a device management client.

FIG. 10 shows a distributed system 700 that can implement the techniques described herein. The system 700 may be suitable for use in vehicles, utility equipment, appliances, infrastructure equipment, or similar apparatus in which not all functionality is contained within one housing or at the same location.

The system can include a wireless module 702, a user device 704, and one or more other devices 706, which may be interconnected by way of a bus 708, for example.

The wireless module 702 is configured to communicate with a network (e.g., network 12 of FIG. 1) via a radio tower 18, wireless access point 20, or similar. The wireless module 702 includes a transmitter and receiver 710 for this purpose. In addition, the wireless module 702 can include a processor 712 for controlling such communication, memory 714 for storing programs and data 716 related to operation of the wireless module 702, and an input/output (I/O) interface 718 for communicating with the bus 708. In operation, the wireless module 702 communicates data between the devices 704, 706 and the network 12. The memory 714 may further store a DM client, as discussed elsewhere herein, for updating firmware (e.g., programs and/or data 716) of the wireless module 702.

The user device 704 is configured to provide user-based functions to the system 700, such as information input and output, applications, media recording or playback, and similar. The user device 704 may be similar to the mobile device 16 described elsewhere herein, and the description of the device 16 can be referenced for further features. The user device 704 may include a user interface 720, which can include a display, touchscreen, buttons, speaker/microphone, and the like, to facilitate user interaction. In addition, the user device 704 can include a processor 722 for controlling the user interface 720 and other components of the user device 704, memory 724 for storing programs and data 726 related to operation of the user device 704, and an I/O interface 728 for communicating with the bus 708. The memory 724 can further store a DM client 730 for implementing the techniques described herein to update the firmware (e.g., programs and/or data 726) of the user device 704.

Other devices 706 may include devices such as sensors, data stores, input devices, displays, touchscreens, audio devices, computers, vehicle control systems/computers, and the like. A device 706 may include a DM client, as discussed elsewhere herein, for updating its firmware.

The components 702, 704, 706 of the system 700 may be removable from the system 700. For example, the user device 704 may be a smartphone or tablet computer that is removably connectable to a vehicle dashboard. In such an example, the bus 708 may be a controller area network (CAN) bus or similar. Other examples will also be apparent to those skilled in the art.

It is advantageous that the techniques described herein allow a FUMO to specify multiple different locations of multiple different update files that contribute to a firmware update for a mobile device, so that a multitude of permutations of single update files need not be pre-generated or generated on the fly. A particular mobile device merely has to fetch the component update files indicated by its FUMO to effect its own particular update. Further, the different files contributing to a firmware update can be distributed at different update servers or on a content distribution network, so as to distribute network loads. In addition, conditions for downloading the different update files can be specified in metadata of the FUMO to further distribute network loads and improve the efficiency of OMA updates. Moreover, the techniques described herein may allow firmware updates to be linearly scalable and, further, can be implemented to comply with OMA FUMO standards.

Additional details for implementing the techniques described herein may be found in U.S. Pat. No. 8,307,095, which is incorporated herein by reference.

According to one aspect of the present disclosure, a method of updating firmware on a mobile device includes initiating a device management session between a mobile device and one or more servers. The device management session occurs via a network having at least one wireless service with which the mobile device communicates. The method further includes the server providing data to at least one node of a firmware update management object stored at the mobile device. The data indicates a plurality of different update file locations accessible via the network. The method further includes sending a command from the server to the mobile device. The command targets a node of the firmware update management object. The method further includes the mobile device downloading a plurality of update files from the plurality of different update file locations via the network in response to receiving the command at the mobile device.

The method can further include the server providing metadata to the at least one node or at least one other node of the firmware update management object. The metadata expresses at least one condition that the mobile device must meet to download one or more of the plurality of update files.

The at least one condition can specify at least a time at which to download one or more of the plurality of update files.

The at least one condition can specify at least a type of wireless service over which to download one or more of the plurality of update files.

The at least one condition can specify a maximum amount of data to download over a specified type of wireless service.

The at least one condition can specify an order in which to download the plurality of update files.

The at least one condition can specify an operating condition of a vehicle in which the mobile device is disposed.

The at least one node can include an unspecified node of the firmware update management object.

A package uniform resource locator node of the firmware update management object can identify a single update file, and the at least one node indicating the plurality of different update file locations is not the package uniform resource locator node.

The at least one node can be a package uniform resource locator node of the firmware update management object, and the package uniform resource locator node identifies a single manifest update file containing the data indicating the plurality of different update file locations.

The method can further include precaching the plurality of update files on a content distribution network.

The method can further include the mobile device updating the firmware with the plurality of update files.

According to another aspect of the present disclosure, a system for updating firmware of mobile devices at least one server configured to establish device management sessions with the mobile devices via a network having at least one wireless service over which the mobile devices and the server communicate and provide data to nodes of firmware update management objects stored at the mobile devices. The data indicates a plurality of different update file locations accessible via the network. The server is further configured to send commands to the mobile devices, and the commands are configured to cause the mobile devices to download pluralities of update files from the plurality of different update file locations via the network.

The server can be further configured to provide metadata to the nodes or other nodes of the firmware update management object, the metadata expressing conditions that mobile devices must meet to download respective update files of the plurality of update files.

The conditions can specify one or more of times at which to download the respective update files, types of wireless service over which to download the respective update files, maximum amounts of data to download over specified types of wireless service, orders in which to download the respective update files, and operating conditions of vehicles in which the mobile devices are disposed.

The nodes can include unspecified nodes of the firmware update management objects.

Package uniform resource locator nodes of the firmware update management objects can identify single update files. The nodes indicating the plurality of different update file locations are not the package uniform resource locator nodes.

The nodes can be package uniform resource locator nodes of the firmware update management objects, and the package uniform resource locator nodes identify respective single manifest update files containing respective data indicating the plurality of different update file locations.

The server can be further configured to precache the plurality of update files on a content distribution network.

According to another aspect of the present disclosure, a mobile device includes a processor, a communication module coupled to the processor and configured to communicate with a server over a network and at least one wireless service, and memory coupled to the processor and storing a firmware update management object. The processor is configured to establish a device management session with the server and store data received from the server during the device management session in at least one node of the firmware update management object. The data indicates a plurality of different update file locations accessible via the network. The processor is further configured to receive a command from the server, the command targeting a node of the firmware update management object. The processor is further configured to download a plurality of update files from the plurality of different update file locations via the network in response to receiving the command.

While the foregoing provides certain non-limiting example embodiments, it should be understood that combinations, subsets, and variations of the foregoing are contemplated. The monopoly sought is defined by the claims.

What is claimed is:

1. A method of updating firmware on a mobile device, the method comprising:
   initiating a device management session between the mobile device and a server, the device management session occurring via a network having at least one wireless service with which the mobile device communicates;
   providing data from the server to at least one node of a firmware update management object stored at the mobile device, the data indicating a plurality of different update file locations accessible via the network, and the at least one node is a package uniform resource locator node of the firmware update management object, and the package uniform resource locator node identifies a single manifest update file containing the data indicating the plurality of different update file locations;
   providing metadata from the server to the at least one node or at least one other node of the firmware update management object stored at the mobile device, the metadata expressing at least one condition that the mobile device must meet to download one or more of a plurality of update files; and
   sending a command from the server to the mobile device, the command targeting a node of the firmware update management object.

2. The method of claim 1, wherein the at least one condition specifies at least a time at which to download one or more of the plurality of update files.

3. The method of claim 1, wherein the at least one condition specifies at least a type of wireless service over which to download one or more of the plurality of update files.

4. The method of claim 3, wherein the at least one condition specifies a maximum amount of data to download over a specified type of wireless service.

5. The method of claim 1, wherein the at least one condition specifies an order in which to download the plurality of update files.

6. The method of claim 1, wherein the at least one condition specifies an operating condition of a vehicle in which the mobile device is disposed.

7. The method of claim 1, wherein the at least one node comprises an unspecified node of the firmware update management object.

8. The method of claim 1, wherein a package uniform resource locator node of the firmware update management object identifies a single update file, and the at least one node indicating the plurality of different update file locations is not the package uniform resource locator node.

9. The method of claim 1, further comprising precaching the plurality of update files on a content distribution network.

10. The method of claim 1, further comprising the mobile device updating the firmware with the plurality of update files.

11. A system for updating firmware of mobile devices, the system comprising:
   a server configured to:
   establish device management sessions with the mobile devices via a network having at least one wireless service over which the mobile devices and the server communicate;

provide data from the server to nodes of firmware update management objects stored at the mobile devices, the data indicating a plurality of different update file locations accessible via the network, and the nodes are package uniform resource locator nodes of the firmware update management objects, and the package uniform resource locator nodes identify respective single manifest update files containing respective data indicating the plurality of different update file locations;

provide metadata from the server to the nodes or other nodes of the firmware update management objects stored at the mobile devices, the metadata expressing conditions that mobile devices must meet to download respective update files of a plurality of update files; and send commands to the mobile devices, the command targeting a node of the firmware update management object.

12. The system of claim 11, wherein the conditions specify at least one of the following:

times at which to download the respective update files;

types of wireless service over which to download the respective update files;

maximum amounts of data to download over specified types of wireless service;

orders in which to download the respective update files; and operating conditions of vehicles in which the mobile devices are disposed.

13. The system of claim 11, wherein the nodes comprise unspecified nodes of the firmware update management objects.

14. The system of claim 11, wherein package uniform resource locator nodes of the firmware update management objects identify single update files, and the nodes indicating the plurality of different update file locations are not the package uniform resource locator nodes.

15. The system of claim 11, wherein the server is further configured to precache the plurality of update files on a content distribution network.

16. A mobile device comprising:

a processor;

a communication module coupled to the processor and configured to communicate with a server over a network and at least one wireless service; and memory coupled to the processor and storing a firmware update management object;

the processor is configured to:

establish a device management session with the server;

store data received from the server during the device management session in at least one node of the firmware update management object, the data indicating a plurality of different update file locations accessible via the network, and the at least one node is a package uniform resource locator node of the firmware update management object, and the package uniform resource locator node identifies respective a single manifest update file containing respective data indicating the plurality of different update file locations;

store metadata received from the server in the at least one node or at least one other node of the firmware update management object, the metadata expressing conditions that mobile devices must meet to download respective update files of a plurality of update files;

providing the data from the server to the at least one node of a firmware update management object stored at the mobile device;

receive a command from the server, the command targeting a node of the firmware update management object.

* * * * *